(No Model.)
T. KERSHAW.
Rag Picking Machine.
No. 241,375. Patented May 10, 1881.
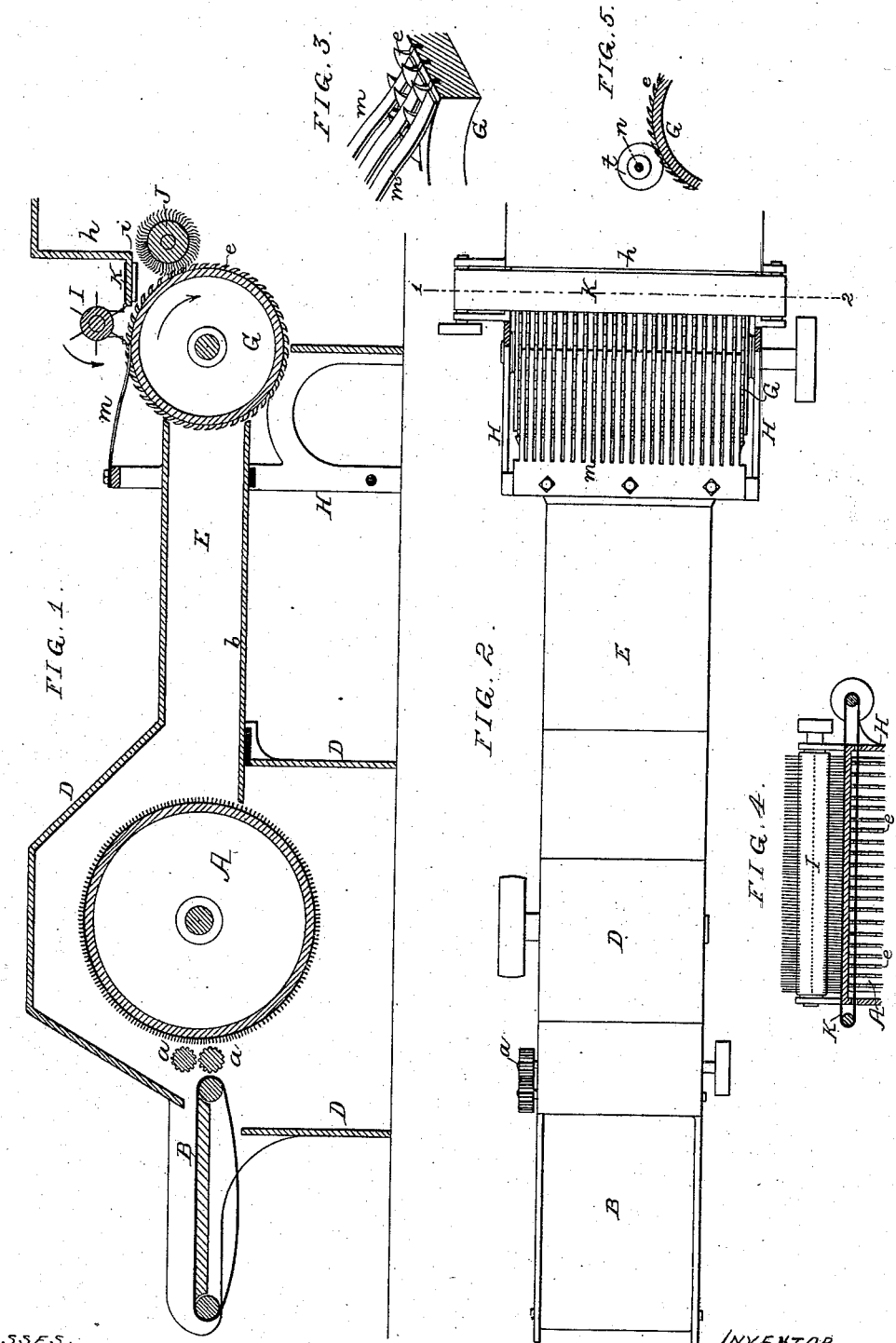
WITNESSES:
James F. Tobin
Hervey Howson Jr.
INVENTOR:
Thomas Kershaw
by his Attorneys.
Howson and Son

United States Patent Office.

THOMAS KERSHAW, OF PHILADELPHIA, PENNSYLVANIA.

RAG-PICKING MACHINE.

SPECIFICATION forming part of Letters Patent No. 241,375, dated May 10, 1881.

Application filed October 18, 1880. (No model.)

*To all whom it may concern:*

Be it known that I, THOMAS KERSHAW, a citizen of the United States, residing in Philadelphia, Pennsylvania, have invented certain Improvements in Rag-Picking Machines, of which the following is a specification.

My invention consists of certain improvements in or additions to a rag-picking machine, for the purpose of automatically separating lumps from the properly picked or disintegrated fibers, my said improvements being too fully explained hereinafter to need preliminary explanation.

In the accompanying drawings, Figure 1 is a vertical section of a rag-picking machine with my improvement; Fig. 2, a plan view; Fig. 3, a perspective view, illustrating part of my improvement; Fig. 4, a modification of part of the machine; and Fig. 5, a transverse section on the line 1 2, Fig. 2.

A represents the picking-cylinder of a rag-picking machine; $a\ a$, the feed-rolls, and B the endless apron by which the masses of rags are directed to the said rolls.

The above-mentioned parts, as well as the casing D in which the cylinder and rolls are contained, are substantially the same as in ordinary rag-picking machines.

The difficulty heretofore experienced in the operation of machines of this class has been this: while the greater portion of the rags were torn and disintegrated to the desired extent, so many lumps escaped in an entire condition, that it became necessary to resubmit the entire mass to the machine, or to pick out the lumps by hand for future treatment.

By my improvements the lumps are separated automatically from the fibers in the manner which I will now proceed to describe.

A pipe or duct, E, preferably of quadrangular form, projects from, communicates with, and is of the same width as the casing D, the bottom $b$ of the pipe extending so near to the picking-cylinder, that it will just clear the teeth of the said cylinder, so that all the disintegrated rags accompanied with lumps will be forced through the pipe by the blast created by the rapidly-revolving picking-cylinder.

The outer end of the pipe is closed, or nearly so, by the cylinder G, which is caused to revolve in the direction of the arrow, and which is provided with toothed rings $e$, arranged at uniform distances apart, as in the cylinders of burring-machines, and as shown in Figs. 2 and 3.

To the frames H, in which the shaft of the cylinder G has its bearings, are secured a series of elastic tongues, $m$, which bear on the cylinder G, between the toothed rings, each tongue being slightly less in width than the space between two adjoining rings.

Above the cylinder G is a shaft, I, having its bearings in the frame H, and from this shaft project radial teeth the points of which, as the shaft revolves, come very nearly into contact with the teeth of the rings of the cylinder G. A stripping-cylinder, J, provided with teeth or card-clothing has its bearings in the frame, the teeth of this cylinder projecting, as shown in Fig. 1, between those of the cylinder G.

Between the cylinder G and shaft I is a transverse endless band, K, which passes over rollers, one of which is driven by any suitable gearing or belting, so that the belt or apron may traverse continuously when the machine is in motion.

At the rear of the toothed shaft J there is a vertical shield, $h$, which may be secured to the frame H or to any fixed object, and from this shield projects a horizontal board or plate, $i$, which so supports the upper portion of the endless apron as to prevent the same from sagging.

The rags, torn to a fibrous mass by the picking-cylinder, must be forcibly impelled against the cylinder G, by the teeth of which the fibers are carried upward to the elastic tongues $m$, which press the fine fibers against the surface of the cylinder. Lumps or pieces of rags, however, which have not been properly disintegrated will be caught by the points of the teeth, and will not be pressed against the surface of the cylinder, but will be carried by the teeth within range of the teeth of the rapidly-revolving shaft I, and these teeth will pick the lumps from the cylinder G and throw them against the shield $h$, whence they will fall onto the endless apron K, and be conveyed by the latter to a point where they will fall into any suitable receptacle, from which they can be removed from time to time, and be subjected to the action of the disintegrated picking-cylinder A, the fine fibers which are retained between the toothed rings of the cylinder G being stripped therefrom by the teeth of the roller J.

A system of narrow rollers, t, hung loosely to a fixed spindle, n, may be used in place of the elastic tongues for pressing the fibers against the surface of the cylinder between the toothed rings, as shown in Fig. 5; but I prefer the tongues.

I claim as my invention—

1. The combination of the cylinder G, provided with toothed rings, the pipe or duct E, adapted to the cylinder so as to direct against the same both fibers and lumps, devices for depressing the fibers between the toothed rings of the said cylinder, and a toothed stripping-shaft or roller, I, for striking the protuberant lumps away from the fibers, all substantially as described.

2. The combination of the toothed cylinder G, devices for pressing the fibers between the teeth of said cylinder, the stripper I, endless apron K, and shield h.

In testimony whereof I have signed my name to this specification, in the presence of two subscribing witnesses.

THOMAS KERSHAW.

Witnesses:
JAMES F. TOBIN,
HARRY SMITH.